United States Patent
Brand et al.

(10) Patent No.: US 6,763,022 B1
(45) Date of Patent: Jul. 13, 2004

(54) SWITCHING NETWORK FOR A BROADBAND COMMUNICATION SYSTEM

(75) Inventors: Uwe Brand, München (DE); Hartmut Burghardt, Holzkirchen (DE); Jochen Kessler, Unterhaching (DE); Thomas Neuner, München (DE); Karl-August Steinhauser, München (DE); Thomas Zellerhoff, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/297,314
(22) PCT Filed: Feb. 12, 1998
(86) PCT No.: PCT/DE98/00408
§ 371 (c)(1), (2), (4) Date: Apr. 28, 1999
(87) PCT Pub. No.: WO98/37726
PCT Pub. Date: Aug. 27, 1998

(30) Foreign Application Priority Data

Feb. 18, 1997 (DE) .......................................... 197 06 280

(51) Int. Cl.$^7$ .............................................. H04Q 11/00
(52) U.S. Cl. ...................................... 370/388; 370/537
(58) Field of Search ................................ 370/537, 538, 370/539, 388, 387, 380

(56) References Cited

U.S. PATENT DOCUMENTS

| | | | | |
|---|---|---|---|---|
| 5,202,780 A | * | 4/1993 | Fussanger ................... | 359/125 |
| 5,311,159 A | * | 5/1994 | Miura et al. ................. | 333/204 |
| 5,317,561 A | * | 5/1994 | Fischer et al. .............. | 370/221 |
| 5,704,047 A | * | 12/1997 | Schneeberger ............. | 709/235 |
| 5,781,431 A | * | 7/1998 | Duret et al. ................ | 714/811 |
| 5,846,094 A | * | 12/1998 | Murray et al. ................ | 439/91 |
| 6,097,883 A | * | 8/2000 | Dell et al. ................... | 710/301 |
| 6,222,665 B1 | * | 4/2001 | Neuner et al. .............. | 359/245 |

FOREIGN PATENT DOCUMENTS

EP 0 086 434 B1 8/1983

OTHER PUBLICATIONS

Fischer, Wolfgang et al, "A Scalable ATM Switching System Architecture", IEEE Journal on Selected Areas in Communications, vol. 9, No. 8, (1991), pp. 1299–1307.

Arai, Yoshimitsu et al, "Multigigabit Multichannel Optical Interconnection Modules for Asynchronous Transfer Mode Switching Systems", IEEE (1993) Proceedings—43$^{rd}$ Electronic Components & Technology Conference, pp. 825–830.

Ota, Yusuke et al, "Multichannel Parallel Data Link For Optical Communication", IEEE LTS Magazine of Lightwave Telecommunication Systems, vol. 2, No. 2, (1991), pp. 24–32.

Hino, Shigeki et al, "Asynchronous Transfer Mode Switching LSI Chips with 10–Gb/s Serial I/O Ports", IEEE Journal of Solid–State Circuits, vol. 30, No. 4, (1995), pp. 348–352.

* cited by examiner

Primary Examiner—Chi Pham
Assistant Examiner—Keith M. George
(74) Attorney, Agent, or Firm—Morrison & Foerster LLP

(57) ABSTRACT

The switching network serves for the transmission of digital data signals within a broadband communication system. This switching network is thereby constructed of individual switching elements (KE) that form at least one multi-stage funnel due to a connection to one another. The section for the assemblies of the switching network is selected such that at least one complete funnel is accommodated on the respective assembly. The respective assembly thereby has its external data inputs provided with unidirectionally designed optical/electrical transducers (OML-E) and has its external data outputs provided with unidirectionally designed electrical/optical transducers (OML-S).

8 Claims, 3 Drawing Sheets

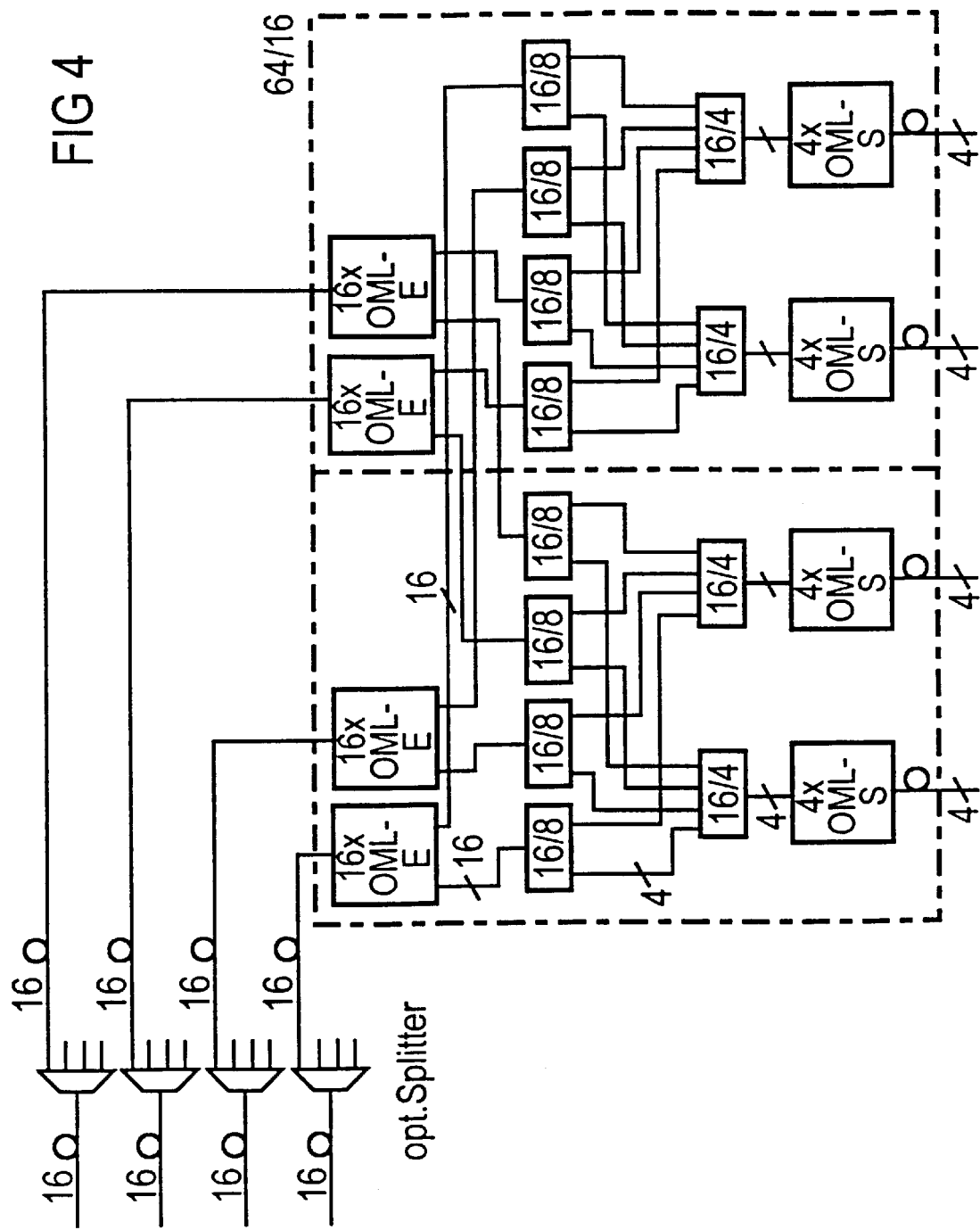

SWITCHING NETWORK FOR A BROADBAND COMMUNICATION SYSTEM

BACKGROUND OF THE INVENTION

The invention is directed to a switching network for a broadband communication system serving for the transmission of digital data signals, whereby the switching network is fashioned such that this is constructed of individual switching elements, that these switching elements respectively comprise a plurality of inputs as well as a plurality of outputs lower in number compared thereto, and such that the switching elements at least form a multi-stage funnel as a result of their connection to one another. Such a switching network is already disclosed by EP-B1-0 086 434.

Fischer, W., et al., "A Scalable ATM Switching System Architecture" IEEE Journal on selected areas of communications, Vol. 9, No. 8, Jan. 10, 1991, pp. 1299–1307, discloses a switching network for a digital broadband communication system wherein the switching network is fashioned such that this is constructed of individual switch elements, that these switch elements respectively comprise a plurality of inputs as well as a plurality of outputs smaller in number compared thereto, that the switch elements form at least one multi-stage funnel due to their connection to one another, and that the section for the assemblies of the switching network is selected such that four complete funnels are accommodated on each of the assemblies.

The aim in the realization of such communication systems is to realize the individual system components, thus including switching networks, with optimally low outlay, which has encountered difficulties in the meantime in practice in the realization of broadband switching networks with the demand of an increasing throughput rate as well as an increasing plurality of input lines and output lines. Given an assumed funnel structure for the switching network, for example, and proceeding from a selected data throughput of the employed components and assemblies, the outlay can increase more than quadratically when one wishes to enlarge the switching network with the same components by corresponding interconnection.

With respect thereto, Yoshimitsu, Arai, et al., "Multigigabit Multichannel Optical Interconnection Modules for Asynchronous Transfer Mode Switching Systems", Proceedings of the Electronic Components and Technology Conference, No. Conf. 43, Jan. 6, 1993, IEEE, pp. 825–830, discloses that a plurality of assemblies are connected to one another with the assistance of optical fiber connections via which information are optically transmitted with high bandwidth, high signal density, low attenuation and uninfluenced by electromagnetic interference. The plurality of the external connections of an assembly can thereby be reduced by the additional use of multiplexers.

SUMMARY OF THE INVENTION

An object of the present invention is to disclose a way of how a switching network of the species initially cited can be realized with economically justifiable costs.

In general terms the present invention is a switching arrangement for a broadband communication system serving for the transmission of digital data signals. The switching arrangement is constructed of individual switching elements. These switching elements respectively have a plurality of inputs as well as a plurality of outputs lower in number compared thereto. The switching elements form at least one multi-stage funnel as a result of their connection to one another. The section for the assemblies of the switching network is selected such that at least one complete funnel is accommodated on the respective assembly. Respectively two funnels are connected electrically parallel in that one of the respectively two funnels is arranged at both sides of the printed circuit board of the respective assembly.

Advantageous developments of the present invention are as follows.

The respective assembly has its external data inputs provided with unidirectionally designed optical/electrical transducers and also has its external data outputs provided with unidirectionally designed electrical/optical transducers.

The at least two funnels are connected electrically parallel at the input side following the optical/electrical transducers.

The respective electrical/optical transducer is fashioned such that data signals or, respectively, clock signals appearing on a line group of differential data lines and a differential clock line allocated thereto are first combined to form an electrical, serial multiplex signal that is subsequently electro-optically converted. The respective optical/electrical transducer is fashioned such that an optical, serial multiplex signal is converted into a plurality of electrical data signals and a clock signal allocated thereto and these data signals as well as the clock signal are forwarded via a line group of differential data lines and a differential clock line, the line group corresponding to the afore-mentioned line group.

The individual, differential data lines as well as the allocated differential clock line on the printed circuit board of the respective assembly are respectively fashioned as differential line pairs of coupled lines.

The respective differential line pair on the printed circuit board is fashioned as coupled tri-plate lines.

All line pairs of a line group are of the same length.

The optical/electrical transducers and electrical/optical transducers are fashioned as transducer modules. The transducer modules are mounted in edge plug-in sockets standing on the longitudinal edge of the respective assembly.

The optical/electrical transducers and electrical/optical transducers are connected to multiplex/demultiplex devices via appertaining optical lines.

The invention thereby yields the advantage that the transmission of data and clock signals within the communication system ensues electrically only within the respective switching network. By contrast thereto, the external signal transmission to or, respectively, from the respective switching network ensues in multiplex mode via optical connecting lines. In this way, the plurality of physical plug interfaces for the transmission of data signals and clock signals can be greatly reduced on the assemblies. Given, for example, a funnel having the structure 64/8 with 64 input ports, 8 output ports and 10 lines per port employed in the switching network, 720 (640+80) electrical plugs for signal inputs and signal outputs would be required in a purely electrical version in view of the technology of the electrical components employed. This number is reduced to 72 optical plug locations (optical fiber junctions), by contrast, when the assumed 10 lines per port are optically multiplexed, i.e. a reduction of plug locations of 10:1 ensues given the assumed example.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 4 shows portions of a switching network constructed of a plurality of funnels.

DESCRIPTION OF THE PREFERRED EMBODIMENTS

Figure 1:
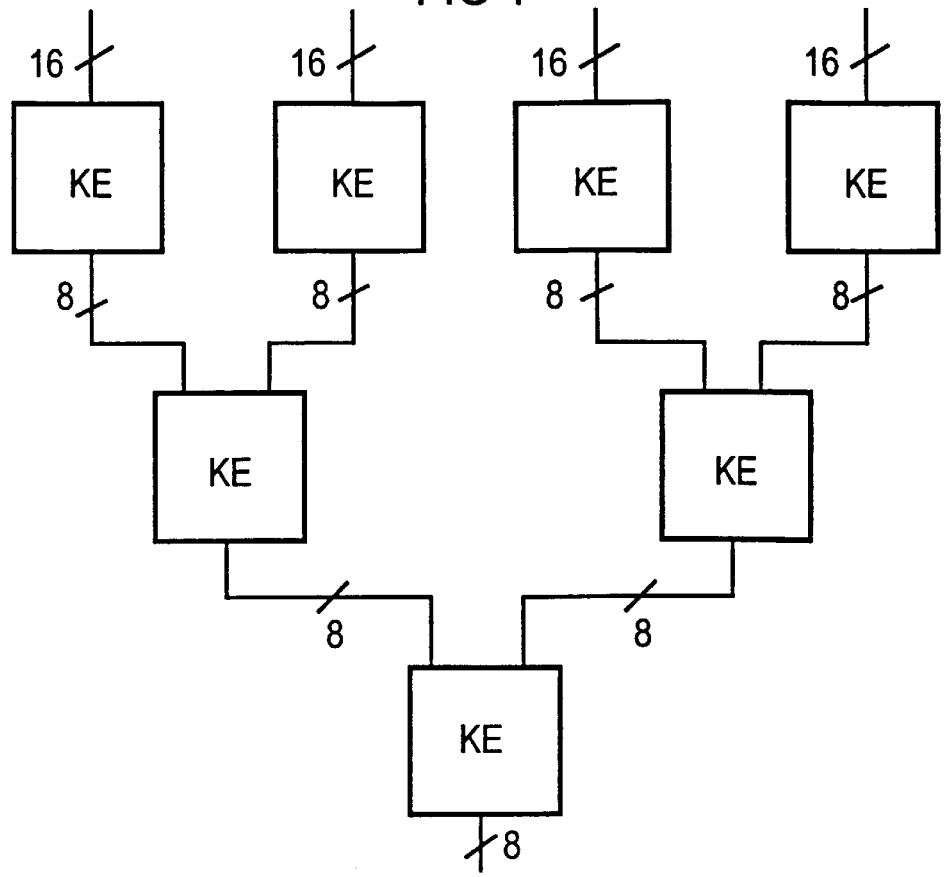
FIG. 1 shows the schematic structure of a multi-stage funnel.

FIG. 1 shows a multi-stage funnel structure as employed in broadband communication systems. An example of such a broadband communication system is a switching system working according to the asynchronous transfer mode (ATM).

As an example, the multi-stage funnel is fashioned with three stages upon employment of switching elements KE each respectively having a structure of 16/8 with 16 input ports, 8 output ports and 10 lines per port. Four switching elements (16/8) are located in the first stage. The 8 output ports of respectively two switching elements of this first stage are conducted onto the 16 input ports of a further coupling element. Two additional switching elements that form a second stage of the funnel resulted therefrom. Finally, the 16 output ports (2×8) of the two switching elements of the second stage are connected to the 16 input ports of a switching element forming a third stage and, thus, the output of the funnel. 64 input ports and 8 output ports can thus be realized with this funnel structure that is constructed overall of 7 switching elements, a total of 640 input lines and 80 output lines deriving therefrom given the aforementioned 10 lines per port. For example, a switching network having the structure 64/64 can be formed by a parallel circuit of 8 such funnels having the structure 64/8, i.e. a switching network having 640 input lines and 640 output lines. A total of 56 switching elements for the assumed switching network 64/64 are thus required with 7 switching elements per funnel.

Figure 2:
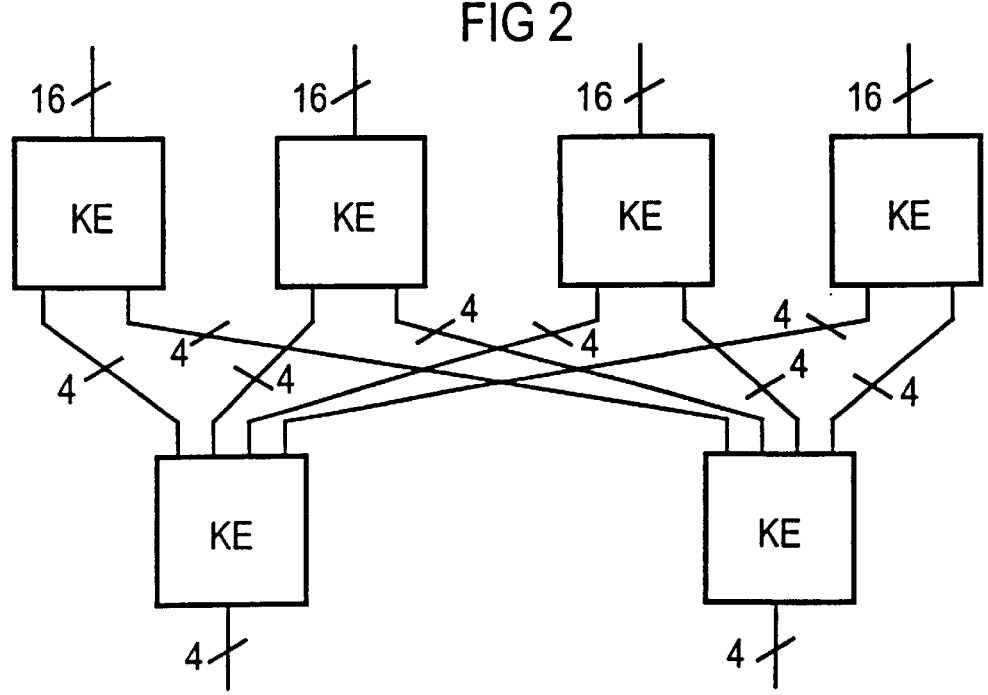
FIG. 2 shows the schematic structure of a shortened, multi-stage funnel.

FIG. 2 shows an alternatively fashioned funnel that, however, is constructed of only two stages. This funnel also initially has four switching elements KE of the aforementioned structure 16/8 in a first stage. The output stage of the funnel is formed by two switching elements having the structure 16/4 or, respectively, the structure 16/8, whereby only four output ports of the 8 output ports of the respective switching element are used given the latter. Respectively four output ports of the individual switching elements of the first stage are conducted onto the 16 input ports of one of the two switching elements of the output stage. The remaining four output ports of each of the switching elements KE of the first stage are connected to the 16 input ports of the remaining switching element of the output stage. 64 input ports and 8 output ports can likewise be realized given this funnel structure that is shortened compared to the funnel structure shown in FIG. 1, a total of 640 input lines and 80 output lines also deriving here given the aforementioned 10 lines per port. As already mentioned for the funnel according to FIG. 1, a switching network having the structure 64/64 can, for example, be formed by a parallel circuit of 8 such shortened funnels having the structure 64/8, i.e. a switching network having 640 input lines and 640 output lines. A difference between the two funnels just explained is comprised merely in the number of switching elements required per funnel. For the funnel according to FIG. 1, thus, 7 switching elements are required, whereas the shortened funnel according to FIG. 2 manages with 6 switching elements. Given employment of funnels according to FIG. 1, thus, a total of 56 switching elements are required for a switching network having the structure 64/64. The plurality of switching elements is reduced to 48 given employment of shortened funnels according to FIG. 2, which leads to a considerable saving in terms of components given large switching networks.

Previous ATM switching arrangements were designed, for example, for throughput rates of up to 20 Gbit/s. The data rate per port within an ATM switching network amounted, for example, to approximately 207 Mbit/s, which is referenced ATM1. This data rate is increased compared to the data rate on external input lines and output lines, being increased by the factor 4/3 since a specific "overhead" to be respectively attached to the signals (message cells) is required for a signal transmission within an ATM switching network. A data rate (net data rate) resulting therefrom derives at approximately 155 Mbit/s and is referenced, for example, as STM1.

The switching network according to the present exemplary embodiment should be optimized with respect to the following criteria:

high switching performance or data throughput, for example 160 Gbit/s low volume low costs (low element and assembly multiplicity, few assemblies)

expandability, even beyond 160 Gbit/s possibility of an accommodation distributed in terms of surface.

On the basis of the aforementioned funnel structures, the outlay increases more than quadratically when, proceeding from a selected data throughput of the employed components and assemblies one wishes to enlarge the overall switching network by corresponding interconnection with the same components. It is therefore necessary to achieve the maximum data throughput rate that can be technically realized both for the individual switching element as well as for the assembly section.

Switching elements 16/8 in CMOS technology having a switching function of 16 input ports onto 8 output ports with respect to the 10 lines per port form the basis for this. This yields 240 high bit rate inputs/outputs having a physical data rate of 830 Mbit/s per port line. I.e. the overall data rate per port amounts to 3.3 Gbit/s, which is also referred to as ATM 16.

As already explained above, this corresponds to net bit rate of 2.4 Gbit/s reduced by the factor 3/4 (also referenced as STM 16).

Based on these switching elements, a switching network having 64 inputs onto 64 outputs (corresponding to a net throughput of 160 Gbit/s) is realized in the exemplary embodiment whereby a total of 56 switching elements are required for this upon employment of a funnel structure according to FIG. 1. Upon realization of a "shortened" funnel according to FIG. 2, however, this structure is reduced to 48 switching elements.

As already indicated above, each funnel forms a switching network having 64 input ports onto 8 output ports. 8 funnels are connected parallel at the input side for the complete switching network.

In order to eliminate as many interfaces as possible between the individual assemblies (and, thus, the outlay for the connection technology), the assembly section is selected such that at least one complete, shortened funnel having the structure 64/8 (6 switching elements given a funnel according to FIG. 2) is located on an assembly. Since, the number of required input lines and output lines, with 720 individual leads, would go far beyond all previously available electrical plug systems given one funnel per assembly, a concept with optical connecting technologies employed here and, thus, the number of plug locations with unidirectional electrical/optical or, respectively, optical/electrical transducers (OML, "optical multiplexer link") is reduced to realizable values of 72 optical input/outputs over the assembly boundary.

The signals respectively appearing at a port—a port is thereby composed of four differential data lines and an appertaining differential clock line—are thereby respectively multiplexed into a serial bit stream and electro-optically converted with an electrical/optical transducer OML-S or, respectively, are converted back with an optical/electrical transducer (OML-E in the opposite direction). The respective optical signal thereby exhibits a data rate of 3.3 Gbit/s, which corresponds to 830 Mbits/s on the four differential data lines. The number of physical plug locations is thus reduced from 720 electrical pins onto 72 optical fiber junctions. In order to be able to accommodate the number of 72 OML-S and OML-E on an assembly, a previously employed assembly format is expanded to twice the height in the present exemplary embodiment. A switching network 64/64 could be constructed with 8 such assemblies upon employment of a total of 576 OML (OML-S and OML-E). The number 576 results from 8×(64 OML-E+8 OML-S).

The degree of utilization of the area on the double-height assemblies is further enhanced by a specific structure for the electro/optical or, respectively, optical/electrical transducers (OML-S or, respectively, OML-E).

The transducer modules (OML-S and OML-E) are mounted in edge plug-in sockets standing on their longitudinal edge. The printed circuit board [sic] of the transducer modules are thereby provided with (pads) and directly plugged into a socket. The mounting via plug-in sockets thereby has the advantage that the transducer modules with the sensitive optical fibers are not thermally loaded during a soldering process, for example during a reflow process. The space requirement per transducer module is minimized by the upright structuring. An interchange of transducer modules can thus be more simply implemented. Over and above this, RF signals can also be transmitted without greater distortions in stripline technology given this plug implementation.

Due to this space optimization, it is possible to accommodate a complete, second, shortened funnel (6 switching elements) on an assembly. In order to be able to drive both funnels, the plurality of electrical/optical transducers must merely be increased by 8 (8×OML-S). The two funnels 64/8 are arranged at both sides of the printed circuit board of the assembly and are thus connected electrically parallel at the input side. The 64 optical/electrical transducers (OML-E) can thus be simultaneously services with the two funnels, which means an enormous saving in terms of components and, thus, costs, dissipated power, etc., at the system side. The outputs of the two funnels are connected to respectively 8 electrical/optical transducers. A switching network with the structure 64/64 can thus now be constructed with 4 instead of with 8 assemblies, as previously, upon employment of a total of only 320 electro/optical or, respectively, optical/electrical transducers (256 OML-E and 64 OML-S).

Figure 3:
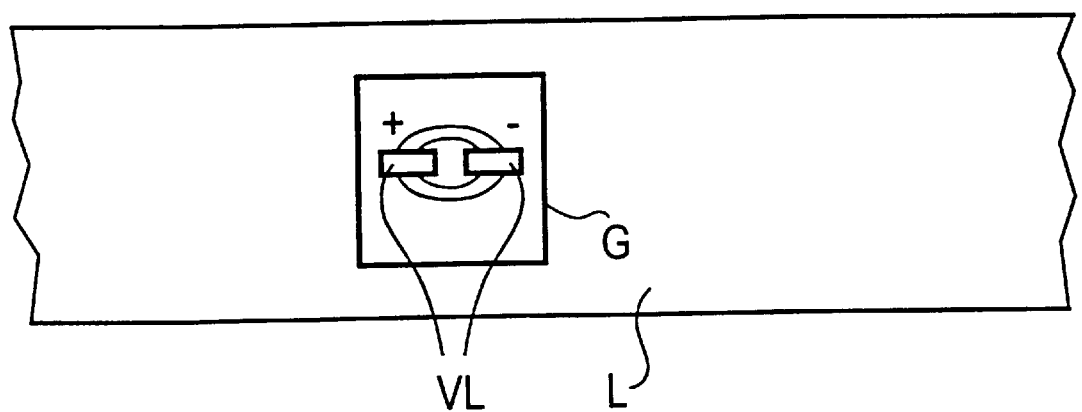
FIG. 3 schematically shows the arrangement of coupled lines on an assembly printed circuit board.

The printed circuit board technology is likewise improved in view of the number of approximately 2,000 830-Mbit/s connections. A uniform utilization of the wiring surfaces of the individual layers is achieved and, thus, a simple disentanglement structure is enabled by suitable placement of the components on the respective assembly printed circuit board. The placement of the total of approximately 1100 component parts as well as the overall disentanglement were facilitated or, respectively, enabled by employing various partial through-contacting types. The necessary wiring area was capable of being cut in half by employing coupled lines for the aforementioned differential data lines. The individual, coupled differential data lines as well as the appertaining, coupled differential clock line are respectively conducted in a separate lien as coupled tri-plate lines for this purpose. The coupled lines guided in a lane are thereby routed isolength, whereby the lane for the differential clock line proceeds between the lanes of the four differential data lines. The principle of the lane formation is schematically shown in FIG. 3. A multi-layer printed circuit board is thereby referenced L. A lane conducted within this printed circuit board is referenced G.

The two coupled tri-plate lines VL and the electromagnetic field formed between these are thereby outlined within this lane.

As a result of applying said measures, the number of layers of a printed circuit board can be reduced to such an extent that the smallest possible through-contactings can be employed, this also having an especially positive influence in view of the radio-frequency related aspects. In particular, signal distortions are reduced.

Since the assembly is completely equipped with functional components, the voltage supply in the present exemplary embodiment is accommodated on separate assemblies in the form of DC-DC converters. A voltage converter assembly is thereby allocated to every switching assembly.

Additional multiplex/demultiplex devices (assemblies) are provided in order to connect the above-described switching network to further system components. These respectively combine 32 ATM1 channels to form 2 ATM 16 channels per multiplex/demultiplex assembly and are connected to the switching assemblies via the optical lines (links) OML-E and OML-S. As a result of the optical connection technology, the multiplexer assemblies can also be accommodated at a distance as needed (250 n standardized, expandable up to a few km), for example at an arbitrary location of a switching center. Considerable cable costs for the connection between periphery and multiplexer can thus be saved. The parallel connection of the switching assemblies ensues with optical splitters.

FIG. 4 shows a switching assembly BG having the structure 64/16 on which two funnels referenced T1 and T2 are accommodated. Each of the two funnels is fashioned as an above-described, shortened funnel (FIG. 2). The four switching elements of the first stage of the respective funnel thereby comprise a structure of 16/8 (with 16 input ports, 8 output ports and with 10 lines per port, as already mentioned above). In a corresponding way, two switching elements having the structure 16/4 or, respectively, 16/8 (whereof, however, only four output ports are used) are provided in a corresponding way according to FIG. 2 in an output stage of the respective, shortened funnel.

An optical/electrical transducer OML-E is provided for each of the 64 input ports as assembly interfaces to other system components. The 64 electrical input ports (10 lines per port) are connected parallel via these 64 optical/electrical transducers.

As an example, four optical splitters are provided at the optical reception side, these having respectively four outputs with respectively 16 optical terminals. An aforementioned optical/electrical transducer (OML-E) of the assembly shown in FIG. 4 is connected to each of the 16 optical terminals of an output of the individual optical splitters.

The three outputs of the four optical splitters not occupied in FIG. 4 are used in a way that is not shown in order to connect three further switching assemblies BG 64/16 in a corresponding way via these outputs. A switching network having a structure of 64/64 thus arises.

The two coupling elements (16/4) in the output stage of the two shortened funnels according to FIG. 4 each respectively have four output ports to which a respective electrical/optical transducer (OML-S) is connected.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A switching network for a broadband communication system for transmitting digital data signals, the switching network having at least one assembler, comprising:

a plurality of individual switching elements;

each of the switching elements having a plurality of inputs and a plurality of outputs, a number of outputs being less than a number of inputs;

the switching elements being interconnected to form at least two multi-stage funnels;

a section for the assemblies of the switching network selected such that at least one complete funnel is accommodated on a respective assembly; and respectively first and second funnels of said multi-stage funnels connected electrically in parallel such that said first and second funnels are respectively arranged on first and second sides of the printed circuit board of the respective assembly, wherein each of a plurality of second electrical/optical transducers is structured such that data signals or, respectively, clock signals appearing on a first line group of differential data lines and a differential clock line allocated thereto, respectively, are first combined to form an electrical, serial multiplex signal that is subsequently electro-optically converted, and wherein each of a plurality of first optical/electrical transducers is structured such that an optical, serial multiplex signal is converted into a plurality of electrical data signals and a clock signal allocated thereto and such that the data signals and the clock signal are forwarded via a second line group of differential data lines and a differential clock line, said second line group corresponding to said first line group.

2. A switching network according to claim 1, wherein the respective assembly has external data inputs provided with the plurality of first optical/electrical transducers unidirectionally configured and also has external data outputs provided with the plurality of second electrical/optical transducers unidirectionally configured.

3. A switching network according to claim 2, the at least two funnels are connected electrically parallel at an input side following the plurality of optical/electrical transducers.

4. A switching network according to claim 1, wherein individual, differential data lines of a respective line group of the first and second line groups as well as an allocated differential clock line of a respective line group of the first and second line groups on the printed circuit board of the respective assembly are respectively differential line pairs of coupled lines.

5. A switching network according to claim 4, wherein a respective differential line pair on the printed circuit board is structured as coupled tri-plate lines.

6. A switching network according to claim 4, wherein all line pairs of a line group are of substantially equal length.

7. A switching network according to claim 1, wherein the plurality of first optical/electrical transducers and the plurality of second electrical/optical transducers are transducer modules; and wherein the transducer modules are mounted in edge plug-in sockets standing on a longitudinal edge of the respective assembly.

8. A switching network according to claim 1, wherein the plurality of first optical/electrical transducers and the plurality of second electrical/optical transducers are connected to multiplex/demultiplex devices via appertaining optical lines.

* * * * *